United States Patent [19]

Sandler

[11] 4,049,612
[45] Sept. 20, 1977

[54] METAL PHOSPHINATES AS SMOKE RETARDANTS FOR POLYVINYL HALIDES

[75] Inventor: Stanley R. Sandler, Springfield, Pa.

[73] Assignee: Pennwalt Corporation, Philadelphia, Pa.

[21] Appl. No.: 636,175

[22] Filed: Nov. 28, 1975

[51] Int. Cl.² .................................................. C08J 3/20
[52] U.S. Cl. ............................ 260/31.8 R; 260/45.7 P;
  260/45.75 R; 260/45.75 C; 260/45.75 N;
  260/45.75 B; 260/45.75 F; 260/45.75 G;
  260/45.75 M; 260/45.75 P; 260/45.75 V;
  260/45.75 W; 260/45.75 K
[58] Field of Search ................... 260/31.8 R, 45.7 P,
  260/45.75 R, 45.75 C, 45.75 N, 45.75 K, 45.75
  M, 45.75 G, 45.75 B, 45.75 P, 45.75 V, 45.75 W

[56] References Cited

U.S. PATENT DOCUMENTS

| 3,179,676 | 4/1965 | Stern ........................... 260/45.75 K |
| 3,296,193 | 1/1967 | Walsh et al. ................. 260/45.75 K |
| 3,344,207 | 9/1967 | Radice ......................... 260/45.75 G |
| 3,786,114 | 1/1974 | Jaquiss et al. ............... 260/45.75 W |
| 3,900,444 | 8/1975 | Rocky et al. ................. 260/45.75 P |

*Primary Examiner*—V. P. Hoke

[57] ABSTRACT

A smoke-retardant polymer composition composed of an admixture of a polyvinyl halide resin and a metal phosphinate having one, two, three or four phosphinate groups per coordination center.

11 Claims, No Drawings

METAL PHOSPHINATES AS SMOKE RETARDANTS FOR POLYVINYL HALIDES

FIELD OF THE INVENTION

This invention relates to the novel use of metal phosphinates as retardants for polyvinyl halides.

STATE OF THE PRIOR ART

Smoke, and especially dense smoke, is a hazard during a fire since it hampers fire-fighting measures and can obscure means of escape. Therefore, it is desirable to develop building materials that emit less smoke during combustion as an added safety feature. In the past, smoke suppressants have had one or more of the following disadvantages: low molecular-weight, insolubility (especially with inorganics such as $Fe_2O_3$ and $MoO_3$) and toxicity. There is, therefore, a need to develop more-compatible and stable additives to reduce smoke at a reasonable cost.

Ferrocene (dicyclopentadienyl iron) has been commercialized under the trademark FE-55 by Arapahoe Chem., Inc. [see Tech. Brochure B-2191 (1974), and J. J. Kracklauer and C. J. Sparkes, Soc. Plast. Eng. Tech. Paper 20, 616 (1974); *Chem. Abstracts* 81, 170410 (1974)]. Ferrocene has the disadvantage of being volatile at milling temperatures of 130°-145° C because of its high vapor pressure (vapor pressure 2.6 mm Hg at 100° C). For example, in laboratory work, as a result of the high volatility of FE-55 it is necessary to prepare the formulations in a closed system such as a Banbury mixer or Brabender Plasticorder. The use of an open system such as a roll-mill results in significant losses of the FE-55. FE-55 has also been reported not to be suitable for PVC with more than 10 phr (parts per hundred parts resin) plasticizer since losses of FE-55 due to volatility and migration occur on long-term aging.

Smoke retardants of polyvinyl chloride (PVC), including copolymers, have been reported in the following U.S. Pat. Nos. 3,845,001; 3,846,372; 3,821,151; 3,870,679; 3,819,577; 3,822,234; 3,862,086; 3,878,167; 3,723,139; 3,869,420; 3,880,802. All of these prior art smoke retardants have at least one of the disadvantages discussed supra of low molecular-weight, insolubility and toxicity.

Metal phosphinates have been described in the literature [B. P. Block, Inorganic Macromolecular Review 1, PP. 115-125 (1970)] and the polymer and solubility properties given. However, the use of metal phosphinates as smoke retardants has not been reported in the prior art.

SUMMARY OF THE INVENTION

This invention concerns:

A. A smoke-retardant polymer composition comprising a polyvinyl halide resin admixed with a sufficient amount to reduce smoking of a metal phosphinate having one, two, three or four phosphinate groups per coordination center and selected from the respective formulae:
a. MX, M$a$X, M$a_2$X, M$a_3$X, M(AA)X, M(AA)$_2$X,
b. MX$_2$, M$a$X$_2$, M$a_2$X$_2$, M$ab$X$_2$, M(AA)X$_2$,
c. MX$_3$, M$a$X$_3$, M$a_2$X$_3$, M$ab$X$_3$, M(AA)X$_3$ or
d. MX$_4$ wherein:
M is a metal selected from the group consisting of beryllium, magnesium, calcium, strontium, barium, titanium, zirconium, antimony, bismuth, chromium, molybdenum, tungsten, manganese, iron, ruthenium, cobalt, rhodium, iridium, nickel, palladium, platinum, copper, silver, zinc, cadmium, mercury, alluminum, tin, lead and mixtures thereof;

X is a phosphinate group having the structure

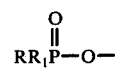

wherein
R and $R_1$ are independently selected from the group consisting of an aliphatic group of 1 to 20 carbons, a cycloaliphatic group of 3 to 20 carbons, an aromatic group of 6 to 12 carbons and said aliphatic, cycloaliphatic or aromatic group can have a substituted group thereon, the substituted group being selected from the class consisting of a halogen, ehter, hydroxyl, alkoxyl, ketone and ester; R can also be hydrogen;

a and b are independent unidentate groups selected from the class consisting of oxy, alkoxy, hydroxyl and halide; and, AA is a bidentate ligand selected from the group consisting of acetylacetonate, picolinate, 8hydroxyquinolinate, dimethyl glyoximate and glycinate.

B. The process of preparing a smoke retardant polyvinyl halide resin comprising mixing a polyvinyl halide resin with a sufficient amount to reduce smoking of a meta phosphinate having one, two, three or four phosphinate groups per coordination center. The definition of the metal phosphinates are the same as mentioned above.

DETAILED DESCRIPTION OF THE INVENTION

It has now been discovered that the metal phosphinates used in preparing the smoke retardant formulations of this invention overcome the disadvantages of the prior art in that they are sufficiently soluble in polyvinyl halides and are of high enough molecular weight and melting point to prevent volatility loss and to insure good processing. These formulations can be used in any area where a polyvinyl halide material is needed which produces substantially less smoke during combustion than the material produces alone.

The metal phosphinates used in this invention are monomeric, oligomeric, or polymeric species with one, two, three, or four phosphinate groups per coordination center. The following are the general types of compositions:
a. one phosphinate per center; MX, M$a$X, M$a_2$X, M$a_3$X, M(AA)X, M(AA)X$_2$;
b. Two phosphinates per center; MX$_2$, M$a$X$_2$, M$a_2$X$_2$, M$ab$X$_2$, M(AA)X$_2$;
c. Three phosphinates per center MX$_3$, M$a$X$_3$, M$a_2$X$_3$, M$ab$X$_3$, M(AA)X$_3$
d. Four phosphinates per center, MX$_4$.

In these formulae M represents the coordination center and is selected from the Groups of metals in the Periodic Table of elements of IIA, IVB, VB, VIB, VIIB, VIII, IB, IIB, IIA, IVA and VA.

X is the phosphinate group

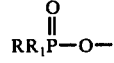

wherein:

R and $R_1$ are selected from (i) an aliphatic group of 1 to 20 carbons with the preferred being linear or branched alkyl or alkenyl group of 1 to 12 carbons such as methyl, butyl, octyl or dodecyl, (ii) a cycloaliphatic group of 3 to 20 carbons such as cyclopropyl, cyclohexyl, cyclooctyl, or cyclododecyl, or (iii) an aromatic group of 6 to 12 carbons such as phenyl, methylphenyl, t-butyl phenyl or naphthyl. Each of the above definitions of R and $R_1$ can optionally have substitutions thereon such as a halogen (F, Cl, Br, I), ether, hydroxyl, alkoxyl ketone or ester. R can also be hydrogen.

a and b are unidentate groups such as oxy, alkoxy, hydroxyl or halide; and

AA is a bidentate ligand such as acetylacetonate, picolinate, 8-hydroxyquinolinate, dimethylglyoximate and glycinate.

"Zinc (II) dibutylphosphinate" has been shown to have a molecular weight greater than 10,000 by vapor pressure osmometry in chloroform. Metal phosphinates are generally prepared [see S. H. Rose and B. P. Block, J. J.A.C.S. 87, 2076 (1965)] by the following reaction as illustrated with cobalt acetate starting material.

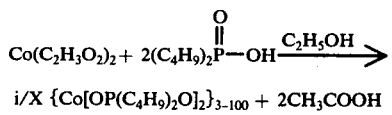

$$1/X \ \{Co[OP(C_4H_9)_2O]_2\}_{3-100} + 2CH_3COOH$$

Representative examples of metal phosphinates have already been described [Inorganic Macromol. Rev. 1, 115 (1970) and elsewhere]. Examples of the four general types of metal phosphinates are as follows:

|  | Degree of polymerization |
|---|---|
| (a) One phosphinate per center |  |
| Al [(CH$_3$)$_2$PO$_2$] (OC$_3$H$_7$)$_2$ | 3 |
| Sn [(C$_6$H$_5$)$_2$PO$_2$] (CH$_3$)$_3$ | 4 |
| (b) Two phosphinates per center: |  |
| Co[(CH$_3$)C$_6$H$_5$PO$_2$]$_2$ | > 30 |
| Ti [(C$_6$H$_5$)$_2$PO$_2$]$_2$O | > 20 |
| Zn [(C$_4$H$_9$)$_2$PO$_2$]$_2$ | > 25 |
| Cr [(C$_6$H$_5$)$_2$PO$_2$]$_2$OH | > 100 |
| (c) Three phosphinates per center: |  |
| Cr [(C$_6$H$_5$)$_2$PO$_2$]$_3$ | > 100 |
| Al [(C$_4$H$_9$) (C$_6$H$_5$CH$_2$)PO$_2$][(C$_8$H$_{17}$)$_2$PO$_2$]$_2$ | 560 |
| (d) Four phosphinates per center: |  |
| Ti [(C$_6$H$_5$)$_2$PO$_2$]$_4$ | 3 |

Preferred metal phosphinates are those based on copper, iron, cobalt, tungsten, manganese, chromium, vanadium, titanium, zinc and molybdenum. Especially preferred metal phophinates are those based on iron, copper, cobalt and tungsten.

Phosphinic acids

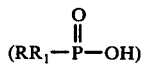

that can be used are as previously described. Representative examples are:

1. Di(n-butyl)phosphinic acid,
2. Di(t -butyl phosphinic acid,
3. Dimethylphosphinic acid,
4. Methyl-phenylphoshphinic acid,
5. Dioctylphosphinic acid,
6. Diphenylphosphinic acid,
7. Dicyclohexylphosphinic acid,
8. Bis(chloroethyl) phosphinic acid,
9. Bis(phenylhydroxymethyl)phosphinic acid,
10. Phenylphosphinic acid
11. Perfluoroalkylethyl-phenylphosphinic acid (where the perfluoroalkyl group is a linear, cyclic or branched group of 1–20 carbons),
12. Bis(trichlorohydroxyethyl)phosphinic acid,
13. Bis(tribromophenyl)phosphinic acid,
14. Bis(trichlorophenyl)phosphinic acid,
15. Bis(hydroxybutyl)phosphinic acid,
16. Bis(tribromohydroxyethyl)phosphinic acid,
17. Octylphosphinic acid,
18. Bis (2-propanoyl)phosphinic acid,
19. Bis (methylcarboxyoctyl)phosphinic acid,
20. Bis(pentafluorocyclohexyl)phosphinic acid,
21. Bis(hydroxymethylfurfuryl)phosphinic acid,
22. Bis(methoxyphenyl)phosphinic acid,
23. Bis(methylcarboxyphenyl)phosphinic acid,
24. Bis(hydroxyphenyl)phosphinic acid,
25. Bis(phenoxyphenyl)phosphinic acid,
26. Bis(iodophenyl)phosphinic acid, and
27. Bis (iodopropyl)phosphinic acid.

Especially preferred examples are the dialkyl, alkylaryl, and diaryl phosphinic acids, as for example:

1. Dibutylphosphinic acid,
2. Dioctyphosphinic acid,
3. Diphenylphosphinic acid, and
4. Methyl-phenylphosphinic acid.

A variety of polyvinyl halide resins are contemplated by this invention. Applicable polyvinyl halides include homopolymers, copolymers, and polymer mixtures as for example:

1. Homopolymers — Polyvinyl chloride, polyvinyl bromide, polyvinyl fluoride, polyvinylidene chloride, polyvinylidene fluoride and the like;
2. Copolymers — Vinyl chloride - vinyl acetate, vinyl chloride - vinyl alcohol, vinyl chloride - vinylidene chloride, vinyl chloride - vinylidene fluoride, vinyl chloride - diethyl maleate and the like; and,
3. Mixtures — Polyvinyl chloride and polydichlorostyrene, polyvinyl chloride and vinyl acetate - vinyl chloride copolymer, polyvinyl chloride, polyvinylidene chloride and a copolymer of vinyl chloride - diethyl maleate and the like.

Although the metal phosphinates are especially effective with polyvinyl halide resins, other resins such as polystyrene, polyamides, polyester, polycarbonates and polyolefins and the like may be also smoke retarded by their use. The metal phosphinates may also be used as flame retardant additives for polymers such as polyester and nylon as evidenced by an increase in the oxygen index when compounded with these materials.

The resins are treated with the smoke retardant additive or additives in any convenient manner. For example, the additive may be blended or mixed with the resin by techniques available in the art. Additives are used in the range of 0.25 to about 30 parts for each 100 parts polymer and preferably from 1–30 parts are employed. However, greater or lesser amounts can be used if desired.

To illustrate the invention, the following examples are presented:

EXAMPLES I-VIII

| Preparation of Sample: | Parts |
|---|---|
| PVC resin | 200 |
| PVC Stabilizer (Dibutyltin bis(isooctyl-thioglycolate) | 4 |
| Smoke retardant to be tested | see results below |
| Polyethylene wax (Ross Wax No. 165) | 2 |

The smoke retardants are mixed with the resin either by hand or with a Waring Blender, Brabender Plastograph, or plastic mill. The resulting sheets are pressed under pressure to give plates of 1/16 inch thickness. Samples are cut into 1 × 1 × 1/16 inch specimens.

The samples are burned in an XP-2 smoke chamber substantially in accordance with ASTM Method D2843-70. The average of two or more values is reported. In some cases, a wire screen is inverted over the sample to prevent the PVC from bending away from the flame.

The maximum light obscuration $A_m$ and the total smoke produced are determined from the automatically plotted curves of light-absorption versus time. In the test, an $A_m$ result less than 100 signifies smoke retardation.

Results:

| Ex. No. | Composition | Additive's Melting Point ° C | Moles Smoke Retardant Used/200g PVC | $A_m{}^a$ | Total Smoke$^b$ |
|---|---|---|---|---|---|
| I | PVC Blank | — | — | 100 | 86 |
| II | Fe[C$_8$H$_{17}$)$_2$PO$_2$]$_2$OH | >300° | 0.0046 | 79 | 58 |
| III | Co[(C$_4$H$_9$)$_2$PO$_2$]$_2$ | 350° (decomp.) | 0.054 | 89 | 68 |
| IV | Cu[(C$_6$H$_5$)$_2$PO$_2$]$_2$ | >300$^c$ | 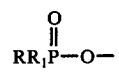 | 85 | 62 |
| V | W[C$_6$H$_5$(CH$_3$)PO$_2$]$_2$(OCH$_3$)$_2$ | 270–280° | | 77 | 59 |
| VI | Zn[C$_6$H$_5$(CH$_3$)PO$_2$]$_2$ | 203–213 | | 93 | 77 |
| VII | Ti[(C$_6$H$_5$)PO$_2$]$_2$iOPr$_2$ | 300° | | 90 | 76 |
| VIII | Ferrocene | 173° C | | 77 | 61 |

$^a$The maximum percent light absorption.
$^b$The area percent under the light absorption versus time curves for each sample.
$^c$Vapor pressure 2.6 mm at 100° C.

Similar results are obtained when using other polyvinyl halide homopolymers, copolymer resin mixtures and plasticized resins.

EXAMPLES IX-X

Plasticized PVC resins are prepared using the following recipe and the technique of Examples I-VIII.

| | Parts |
|---|---|
| PVC resin | 200 |
| PVC Stabilizer (Dibutyltin bis(isooctyl-thiogylcolate) | 4 |
| Dioctyl phthalate | 40 |
| Triarylphosphate | 40 |
| Smoke retardant to be tested | see results below |

The samples are tested as described in Examples I-VIII.

Results:

| Ex. No. | Composition: | Moles Smoke Retardant Used/200g PVC | $A_m{}^a$ | Total Smoke$^b$ |
|---|---|---|---|---|
| IX | PVC Blank | — | 100 | 93 |
| X | Fe[C$_8$H$_{17}$)$_2$PO$_2$]$_2$OH | 0.0039 | 93 | 77 |

$^a$The maximum percent light absorption.
$^b$The area percent under the light absorption versus time curves for each sample.

The use of oligomeric and polymeric metal phosphinates containing different metal centers in the polymer network in addition to mixtures of metal phosphinates and metal phosphinates with one or more types of phosphinic acid groups per metal are also anticipated by this invention as being suitable smoke retardants for polyvinyl halide resins.

Having described the invention what is claimed is:

1. A smoke-retardant polymer composition comprising a polyvinyl halide resin admixed with a sufficient amount to reduce smoking of a metal phosphinate having one, two, three or four phosphinate groups per coordination center and selected from the respective formulae:

a. MX, M$a$X M$a_2$X, M$a_3$X, M(AA)X, M(AA)$_2$X,
b. MX$_2$, M$a$X$_2$, M$a_2$X$_2$, M$ab$X$_2$, M(AA)X$_2$,
c. MX$_3$, M$a$X$_3$, M$a_2$X$_3$, M$ab$X$_3$, M(AA)X$_3$ or
d. MX$_4$ wherein
M is a metal selected from the group consisting of beryllium, magnesium, calcium, strontium, barium, titanium, zirconium, antimony, bismuth, chromium, molybdenum, tungsten, manganese, iron, ruthenium, cobalt, rhodium, iridium, nickel, palladium, platinum, copper, silver, zinc, cadmium, mercury, aluminum, tin, lead and mixtures thereof.

X is a phosphinate group having the structure $$\underset{RR_1P-O-}{\overset{O}{\|}}$$

wherein
R and R$_1$ are independently selected from the group consisting of an aliphatic group of 1 to 20 carbons, a cycloaliphatic group of 3 to 20 carbons, an aromatic group of 6 to 12 carbons and said aliphatic, cycloaliphatic or aromatic group can have a substituted group thereon, the substituted group being selected from the class consisting of a halogen, ether, hydroxyl, alkoxyl, ketone and ester; R can also be hydrogen;
$a$ and $b$ are independent unidentate groups selected from the class consisting of oxy, alkoxy, hydroxyl and halide; and
AA is a bidentate ligand selected from the group consisting of acetylacetonate picolinate, 8-hydroxyquinolinate, dimethylglyoximate and glycinate.

2. The composition of claim 1 wherein the polyvinyl halide is polyvinyl chloride.

3. The composition of claim 1 wherein M is selected from the group consisting of iron, copper, cobalt, tungsten and mixtures thereof.

4. The composition of claim 2 wherein the metal phosphinate is $Fe[(C_8H_{17})_2PO_2]_2OH$.

5. The composition of claim 2 wherein the metal phosphinate is $Co[(C_4H_9)_2PO_2]_2$.

6. The composition of claim 2 wherein the metal phosphinate is $Cu[(C_6H_5)_2PO_2]_2$.

7. The composition of claim 2 wherein the metal phosphinate is $W[C_6H_5(CH_3)PO_2]_2(OCH_3)_2$.

8. The composition of claim 3 wherein the metal phosphinate is a mixture of $Fe[(C_8H_{17})_2PO_2]_2OH$ and $Cu[(C_6H_5)_2PO_2]_2$.

9. A process of preparing a smoke retardant polyvinyl halide resin comprising mixing a polyvinyl halide resin with a sufficient amount to reduce smoking of a metal phosphinate having one, two, three or four phosphinate groups per coordination center and selected from the respective formulae:

a. $MX$, $MaX$, $Ma_2X$, $Ma_3X$, $M(AA)X$, $M(AA)_2X$,
b. $MX_2$, $MaX_2$, $Ma_2X_2$, $MabX_2$, $M(AA)X_2$,
c. $MX_3$, $MaX_3$, $Ma_2X_3$, $MabX_3$, $M(AA)X_3$ or
d. $MX_4$ wherein M is a metal selected from the group consisting of beryllium, magnesium, calcium, strontium, barium, titanium, zirconium, antimony, bismuth, chromium, molybdenum, tungsten, manganese, iron, ruthenium, cobalt, rhodium, iridium, nickel, palladium, platinum, copper, silver, zinc, cadmium, mercury, aluminum, tin, lead and mixtures thereof.

X is a phosphinate group having the structure

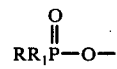

wherein

R and $R_1$ are independently selected from the group consisting of an aliphatic group of 1 to 20 carbons, a cycloaliphatic group of 3 to 20 carbons, an aromatic group of 6 to 12 carbons and said aliphatic, cycloaliphatic or aromatic group can have a substituted group thereon the substituted group being selected from the class consisting of a halogen, ether, hydroxyl, alkoxyl, ketone and ester; R can also be hydrogen;

a and b are independent unidentate groups selected from the clas consisting of oxy, alkoxy, hydroxyl and halide; and AA is a bidentate ligand selected from the group consisting of acetylacetonate, picolinate, 8-hydroxyquinolinate, dimethyl glyoximate and glycinate.

10. The process of claim 9 wherein the polyvinyl halide resin contains a plasticizer.

11. The process of claim 9 wherein the sufficient amount of metal phosphinate is in a range of 0.25 to 30 parts by weight.

* * * * *